United States Patent Office 3,376,339
Patented Apr. 2, 1968

3,376,339
PURIFICATION OF AMPHOTERIC AND BASIC ANTIBIOTICS
Gert Svanholm, Lyngby, Denmark, assignor to Novo Terapeutisk Laboratorium A/S, Copenhagen, Denmark
No Drawing. Filed June 10, 1963, Ser. No. 286,451
Claims priority, application Great Britain, June 12, 1962, 22,584/62
6 Claims. (Cl. 260—559)

This invention relates to the purification of amphoteric or basic antibiotics.

In the production of amphoteric or basic antibiotics an aqueous culture medium containing the antibiotic in question in solution is subjected to a combined recovery and purification process. When this process is carried out by means of extraction the mycelium of the organism, which has produced the antibiotic, is usually first separated from the culture medium. The antibiotic is then extracted with an organic solvent at such a pH-value that as much of the antibiotic as possible is dissolved in the organic phase, the volume of the organic phase being kept considerably smaller than that of the culture medium. The resulting organic phase contains the amphoteric or basic antibiotic in concentrated form. Furthermore, a substantial part of the impurities present in the culture medium are not transferred to the organic phase so that the antibiotic is both concentrated and preliminarily purified. The antibiotic is then brought back to an aqueous phase at a pH-value at which the antibiotic is far more soluble in the latter phase than in the organic solvent. As in the first extraction step, the volume of the extracting agent, i.e. the aqueous phase, is kept considerably smaller than that of the organic phase so that the solution of the antibiotic becomes still more concentrated. At the same time a number of the impurities present in the organic phase are retained in this phase. Thus, there is obtained a concentrated aqueous solution of the antibiotic from which the main part of the impurities originally present in the culture medium has been removed.

The above extraction procedure may be repeated until there is obtained a solution containing the antibiotic in a sufficiently pure and concentrated form to be crystallized or to be precipitated in pure form for later crystallization or formulation.

In connection with the extraction procedures outlined above use has been made of substances, so-called carriers, assisting the transfer of the antibiotic in question from the aqueous phase to the organic phase. In recovering chlorotetracycline and tetracycline surface active compounds of the general formula R—O$_n$—SO$_2$OH, in which R is a hydrophobic organic radical and $n$ is 1 or 0, or quaternary ammonium compounds have been used as carriers and added to the organic solvent used for extracting the chlorotetracycline or tetracycline from the culture medium.

As regards the use of quaternary ammonium compounds as carriers there has been proposed an extraction procedure in which a culture medium containing chlorotetracycline and/or tetracycline together with the mycelium of an organism having produced these antibiotics is extracted directly with a water-immiscible polar organic solvent after addition of the quaternary ammonium compound and controlling as well the pH-value of the culture medium as the concentration of calcium and magnesium ions therein. The extraction process has to be carried out discontinuously as it is necessary in practice to extract the filter cake from the first extraction a second time.

Sulphates or sulfuric acid esters of the above general formula have been used as carriers in the recovery of chlorotetracycline and derivatives thereof as well as in the recovery of streptomycin. However, when employing these carriers the extraction of the aqueous culture medium is not complete as varying amounts of antibiotic are retained in the aqueous phase. Furthermore, the extraction of chlorotetracycline is carried out by extraction with an organic solvent followed by concentration of the organic phase by evaporation. An acid salt of chlorotetracycline is then crystallized from the concentrated organic phase after the addition of hydrochloric acid. It is difficult to carry out these steps continuously and it is also difficult to recover the carrier for further use.

It has now been found that certain organic phosphoric acid and phosphorous acid esters can be advantageously employed as carriers in the combined recovery and purification of amphoteric or basic antibiotics when these esters are dissolved in a sparingly water-miscible or water-immiscible organic solvent with which the culture medium is extracted after removal or without removal of the mycelium.

In order to be useful for the purpose of the invention the organic esters referred to have to satisfy certain conditions.

Firstly, it is of importance that the esters contain at least one dissociable hydrogen or metal atom in their molecule, i.e. the esters have to be acid esters or acid ester salts. Thus, in case of organic esters of ortho phosphoric acid only monoesters and diesters or their salts are useful organic esters while the esters of phosphorous acid have to be monoesters or their salts.

Secondly, the organic radical forming a part of the ester molecule must have such a hydrophobic nature that the hydrophilic character of the phosphoric or phosphorous acid part of the ester molecule is sufficiently suppressed to make the esters soluble in the organic solvent to which it is desired to transfer the antibiotic from the aqueous phase in which it is present in solution for purification and later recovery. This condition was found to be satisfied when the organic radical contains at least four carbon atoms.

In the process of the invention the impure antibiotic is transferred to a sparingly water-miscible or water-immiscible organic solvent in the presence of a carrier, and the feature of the inventive process consists in using as carrier for the antibiotic one or more organic esters of phosphoric or phosphorous acid, said esters containing in their molecule at least one dissociable hydrogen or metal atom, the organic radical or radicals of said esters being of sufficient hydrophobic nature to make the esters soluble in the said organic solvent.

Useful diesters of ortho phosphoric acid having the general formula

are such in which R$^1$ and R$^2$ designate an aliphatic group containing at least four and up to ten carbon atoms. Examples of such esters are dibutyl, dipentyl, dihexyl, diheptyl, dioctyl, such as di-2-ethylhexyl, and dinonyl ortho phosphoric acid esters. However, it is not necessary that R$^1$ and R$^2$ designate the same aliphatic group.

If R$^1$ and R$^2$ mean a lauryl group the ester will not be completely soluble in the organic solvent and not act as a proper carrier for the antibotics. The same applies to the diphenyl and dibenzyl ortho phosphoric acid esters.

In case of monoesters of phosphoric acid or phosphorous acid the organic radical R$^1$ forming a part of the esters may be an aliphatic group containing more than ten carbon atoms, such as a stearyl or lauryl group, or an aromatic group, such as a phenyl or benzyl group.

Also coresponding esters of pyrophosphoric acid may be used.

Generally, small scale experimental tests will show whether a selected phosphoric or phosphorous acid ester is useful for the purpose of the invention.

The amount of the esters referred to to be used as carrier for the antibiotics depends on the antibiotic in question, the concentration thereof and the amount of impurities present. In order to obtain useful results the ester should be present in an amount of at least 1 percent by weight of the organic solvent used, and increasing amounts of the ester are required with increasing concentration of the antibiotic. From an economical point of view it is not convenient to use the ester in amounts above 15 to 20 percent by weight of the organic solvent used.

The various amphoteric or basic antibiotics require different amounts of the esters to obtain optimal purification. In connection with tetracycline it is preferred to use the ester in an amount of 2 to 5 percent by weight of the organic solvent while amounts of 1.5 to 2 percent by weight are preferred in connection with polymixin and 5 to 10 percent are preferred in connection with streptomycin.

The esters referred to are not all effective carries in connection with all amphoteric or basic antibiotics. While di(2-ethylhexyl) - ortho - phosphoric acid and di-nonyl-ortho-phosphoric acid are useful carriers in connection with both tetracycline and streptomycin and polymyxin, di-butyl-ortho-phosphoric acid is only a useful carrier in connection with tetracycline.

The organic solvent used in the purification process of the invention may be any organic solvent immiscible or sparingly miscible with water and acting as a solvent for the antibiotic in question. Such solvents are well-known in the art. Examples are butyl acetate, chloroform, amyl alcohol and methyl isobutyl ketone.

The extraction of the antibiotics referred to using as carrier one of the above esters results in high yields of the antibiotic due to the fact that the carrier causes the distribution ratio of the antibiotic to be changed very much for the benefit of the organic phase containing the carrier. Thus, a high percentage of the antibiotic in the culture medium is transferred to the organic phase.

According to one embodiment of the invention the antibiotic present in solution together with the impurities in an aqueous medium is transferred to the organic solvent containing one or more of the esters referred to. This embodiment is useful in connection with all the antibiotics tested and is preferred on industrial scale.

According to another embodiment of the invention in connection with the purification of tetracycline the impure tetracycline is precipitated from an aqueous medium in the presence of one or more of the esters referred to, and the precipitate obtained is then extracted with the organic solvent. This embodiment appears to be able to give slightly higher yields than the first mentioned embodiment but is only suited for batch operations and not so simple to handle.

After the purification according to the invention the antibiotics may be recovered in a manner known per se.

The following examples illustrate the inventive purification of crude and impure solutions of tetracycline, polymyxin B and streptomycin.

Example 1

After filtering off the mycelium 300 ml. of fermentation liquid from a tetracycline fermentation were extracted successively with three 30 ml. portions of a solution of 2% di-(2-ethylhexyl)-ortho-phosphoric acid and 0.5% tris-n-butyl phosphate in butyl acetate. The pH-value was kept at 6.20 by adding sodium hydroxide. The aqueous residue contained less than 0.5% of the tetracycline activity in the starting liquid. The organic phases were mixed and extracted two times with 15 ml. portions of water having a pH-value of 1.20 which was obtained by adding concentrated hydrochloric acid to the water before extraction. The volume of the two extracts was 30 ml. corresponding to a tenfold concentration of the starting liquid. The extracts contained more than 95% of the tetracycline activity in the starting liquid whereas the organic phase contained less than 5% of the activity.

Example 2

32 liters of filtered culture liquid from a polymyxin B fermentation containing $50 \times 10^6$ units of polymyxin B were extracted with 6.4 liters and thereafter with 3.2 liters of a solution of 1% di-(2-ethylhexyl)-ortho-phosphoric acid in butyl acetate at a pH-value of 7.0. The aqueous residue contained $1.5 \times 10^6$ units of polymyxin B (3%) and was discarded. The organic phases (8.8 liters) contained $50 \times 10^6$ units (100%) and were first extracted with 600 ml. of water and thereafter with 200 ml. of water at a pH-value of 2.0 which was secured by adding concentrated hydrochloric acid to each portion of water. There were obtained 880 ml. of concentrated aqueous solution containing $49.3 \times 10^6$ units of polymyxin B (99%) and an organic residue which contained $0.1 \times 10^6$ units (less than 1%). This residue was used in the next extraction of the culture liquid.

Example 3

400 ml. of filtered streptomycin fermentation liquid containing 4850 units of streptomycin per ml. were extracted successively with three 50 ml. portions of a solution of 5% di-(2-ethylhexyl)-ortho-phosphoric acid and 0.5% tris-n-butyl phosphate in chloroform at a pH-value of 6.30. The aqueous residue contained 167 units per ml. (3.5%) whereas the chloroform extracts (35 ml. containing 21400 units per ml. containing 15100 units per ml. and 43 ml. containing 5000 units per ml.) contained 86% of the streptomycin activity. The organic phases were extracted two times with two 20 ml. portions of water at a pH-value of 2.0 which was secured by adding concentrated hydrochloric acid to each portion of water. The chloroform residue contained less than 100 units of streptomycin per ml. whereas the aqueous phases contained 79% of the streptomycin activity in the starting liquid, the purity being more than 50%.

Example 4

100 ml. of an impure solution of tetracycline containing 4700 units per ml. were extracted with three 25 ml. portions of a mixture of 10% di-n-butyl phosphate in chloroform. Hereby there was obtained an extract of 62 ml. containing 420 mg. tetracycline (89%) whereas the aqueous residue contained 690 units per ml. (15%).

Example 5

After filtering off the mycelium from a tetracycline fermentation culture liquid 250 ml. of the filtrate were extracted three times with 30 ml. of a mixture consisting of 90 ml. of butyl acetate and 10 ml. of "Lensodel A" produced by Shell in England and containing as active component sodium-dinonyl-phosphate, the pH-value of the filtrate being adjusted to 5.5 by addition of sodium hydroxide. The aqueous residue contained less than 50 units of tetracycline activity per ml. The main part of the tetracycline activity was found in the organic phase from which it can be transferred to an aqueous phase as described in Example 1.

EXAMPLE 6

To 5 liters of filtered tetracycline culture liquid were added 50 grams of kieselguhr and 50 grams of di-(2-ethylhexyl)-orthophosphoric acid under vigorous agitation while adding sodium hydroxide in order to obtain a pH-value of 8.5. The mixture was filtered and the precipitate was rinsed with water. The filtrate containing 3 percent of the original activity was discarded. The precipitate was dispersed in 800 ml. of butyl acetate and filtered, rinsed with 50 ml. of butyl acetate and redispersed in 250 ml.

of butyl acetate, filtered and rinsed again with 50 ml. of butyl acetate. There were obtained in total 1270 ml. of butyl acetate extract containing 92 percent of the original activity.

The tetracycline may be transferred from the butyl acetate extract to an aqueous phase as described in Example 1.

Having thus fully described my invention I claim as new and desire to secure by Letters Patent:

1. A process for the purification of an impure antibiotic selected from the group consisting of tetracycline, polymyxin B and streptomycin comprising contacting the antibiotic with a no more than sparingly water-miscible organic solvent for said antibiotic, said contacting taking place while said antibiotic is in the presence of at least one organic ester selected from the group consisting of organic acid esters and organic acid ester salts of phosphorous acid, said organic acid esters having at least one dissociable hydrogen ion and said organic acid ester salts having at least one dissociable metal ion, each organic radical of said organic esters being a saturated hydrocarbon having at least 4 carbon atoms and being hydrophobic, whereby the antibiotic in essentially pure form is transferred to the solvent.

2. A process for the purification of impure tetracycline comprising contacting tetracycline with a no more than sparingly water-miscible organic solvent for said tetracycline, said contacting taking place while said tetracycline is in the presence of at least one organic ester selected from the group consisting of organic acid esters and organic acid ester salts of phosphoric acid and phosphorus acid, said organic acid esters having at least one dissociable hydrogen ion and said organic acid ester salts having at least one dissociable metal ion, each organic radical of said organic esters being a saturated hydrocarbon having at least 4 carbon atoms and being hydrophobic, whereby the tetracycline in essentially pure form is transferred to the solvent.

3. A process according to claim 1, in which the organic ester is present in an amount of at least 1 percent by weight of the solvent.

4. A process according to claim 1, in which said organic ester has only one organic radical.

5. A process for the purification of impure tetracycline, comprising contacting tetracycline with a no more than sparingly water-miscible organic solvent for tetracycline, said contacting taking place while said tetracycline is in the presence of at least one organic ester selected from the group consisting of di-(2-ethylhexyl)-phosphoric acid and di-nonyl-ortho-phosphoric acid, whereby tetracycline in essentially pure form is transferred to the solvent.

6. A process for the purification of impure tetracycline contained in an aqueous medium, comprising causing the precipitation of the impure tetracycline from the aqueous medium in the presence of at least one organic ester selected from the group consisting of organic acid esters and organic acid ester salts of phosphoric acid and phosphorous acid, said organic acid esters having at least one dissociable hydrogen ion and said organic acid ester salts having at least one dissociable metal ion, each organic radical of said organic esters being a saturated hydrocarbon having at least 4 carbon atoms and being hydrophobic, and contacting the precipitated impure tetracycline with a no more than sparingly water-miscible organic solvent, whereby the tetracycline in essentially pure form is transferred to the solvent.

References Cited
UNITED STATES PATENTS 3,121,714    2/1964    Gollaher et al. _____ 260—210

SAM ROSEN, *Primary Examiner.*